US009719622B2

(12) United States Patent
Schmidt

(10) Patent No.: US 9,719,622 B2
(45) Date of Patent: Aug. 1, 2017

(54) ELECTROFUSION FITTINGS AND METHODS

(71) Applicant: Georg Fischer Harvel LLC, Easton, PA (US)

(72) Inventor: Phillip P. Schmidt, Conway, AR (US)

(73) Assignee: Georg Fischer Harvel LLC, Easton, PA (US)

( * ) Notice: Subject to any disclaimer, the term of this patent is extended or adjusted under 35 U.S.C. 154(b) by 335 days.

(21) Appl. No.: 14/318,814

(22) Filed: Jun. 30, 2014

(65) Prior Publication Data

US 2015/0008662 A1 Jan. 8, 2015

Related U.S. Application Data

(60) Provisional application No. 61/843,611, filed on Jul. 8, 2013.

(51) Int. Cl.
*F16L 47/03* (2006.01)
*B29C 65/34* (2006.01)
(Continued)

(52) U.S. Cl.
CPC ............ *F16L 47/03* (2013.01); *B29C 65/342* (2013.01); *B29C 65/7844* (2013.01);
(Continued)

(58) Field of Classification Search
CPC . F16L 13/02; F16L 47/02; F16L 47/03; B29C 66/1222; B29C 66/1224;
(Continued)

(56) References Cited

U.S. PATENT DOCUMENTS 1,864,666 A * 6/1932 Osborne .................. H05B 3/00
174/77 R
3,506,519 A * 4/1970 Blumenkranz ....... B29C 65/342
156/274.2
(Continued)

FOREIGN PATENT DOCUMENTS

EP 251482 A2 1/1988
FR 2615266 A1 11/1988
(Continued)

OTHER PUBLICATIONS

Fuseal II, 1½"-6" Fuseal MJ Installation Training, course presentation, George Fischer Inc., Tustin, California, 2009.

*Primary Examiner* — Brian Glessner
*Assistant Examiner* — Adam Barlow
(74) *Attorney, Agent, or Firm* — Bachman & LaPointe, P.C.

(57) ABSTRACT

An electrofusion fiting (20) comprises a fitting body (24) and an electrofusion collar (26). The fitting body (24) has an exterior surface (30), an interior surface (32), and a terminal portion (44) extending to a rim (34). The collar (26) has: an inner wall (42) having a heating element (60); a segmented outer wall (40) spaced radially apart from the inner wall; and a linking portion (46) linking the outer wall and inner wall. The fitting body terminal portion is between the inner wall and the outer wall. The collar and fitting body have interfitting features (150, 152) axially retaining the collar against extraction from the fitting body while permitting relative rotation of the collar and the fitting body.

20 Claims, 5 Drawing Sheets

(51) Int. Cl.
  B29C 65/78 (2006.01)
  B29C 65/00 (2006.01)
(52) U.S. Cl.
  CPC ...... B29C 65/7855 (2013.01); B29C 66/1222 (2013.01); B29C 66/1224 (2013.01); B29C 66/131 (2013.01); B29C 66/5221 (2013.01); B29C 66/52292 (2013.01); B29C 66/52298 (2013.01); B29C 66/5344 (2013.01); B29C 66/8286 (2013.01); B29C 65/3468 (2013.01); B29C 66/71 (2013.01)
(58) Field of Classification Search
  CPC . B29C 66/8286; B29C 66/5344; B29C 66/71; B29C 65/7844; B29C 65/7855; B29C 65/342
  USPC .......................... 156/293, 294; 285/21.1, 21.2
  See application file for complete search history.

(56) References Cited

U.S. PATENT DOCUMENTS

| | | | |
|---|---|---|---|
| 3,954,541 A | 5/1976 | Landgraf | |
| 3,994,515 A | 11/1976 | Cotten | |
| 4,713,129 A | 12/1987 | Inhofe, Jr. | |
| 5,911,895 A | 6/1999 | Porfido | |
| 6,250,686 B1 * | 6/2001 | Becker | B29C 65/342 285/21.2 |
| 6,375,226 B1 | 4/2002 | Dickinson | |
| 6,428,054 B1 | 8/2002 | Zappa | |
| 6,680,464 B1 * | 1/2004 | Carter, Jr. | F16L 47/03 156/274.2 |
| 6,769,719 B2 | 8/2004 | Genoni | |
| 2006/0016552 A1 | 1/2006 | Barbone et al. | |
| 2007/0057504 A1 | 3/2007 | Boundry et al. | |
| 2009/0256349 A1 * | 10/2009 | Strubin | B29C 45/1459 285/21.2 |
| 2010/0084097 A1 * | 4/2010 | Stauffer | B29C 65/66 156/379.8 |
| 2011/0227335 A1 * | 9/2011 | Mastro | B29C 65/342 285/288.5 |
| 2015/0267852 A1 * | 9/2015 | Kwak | H05B 1/0283 156/49 |

FOREIGN PATENT DOCUMENTS

| | | |
|---|---|---|
| GB | 839743 A | 6/1960 |
| GB | 2260381 A | 4/1993 |

* cited by examiner

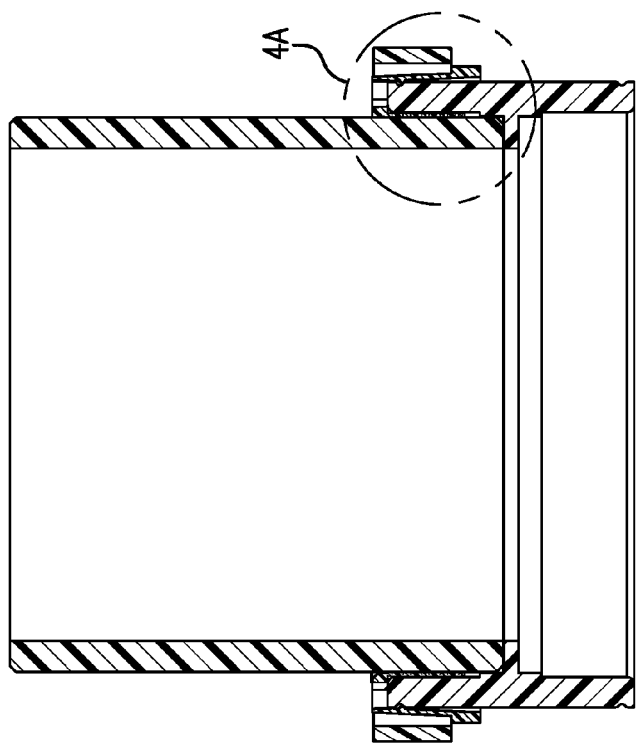
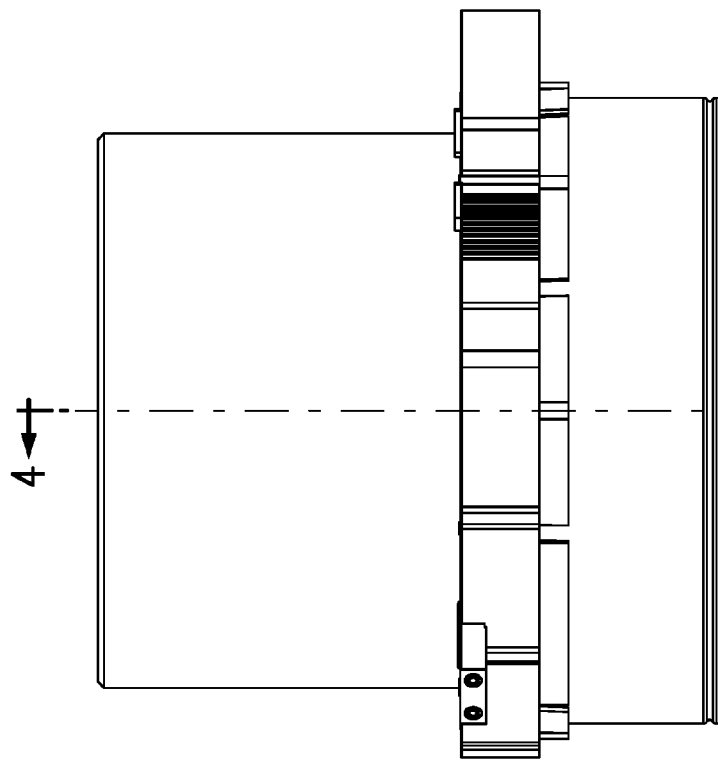
FIG. 4
FIG. 3

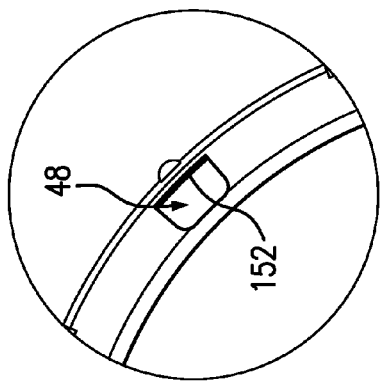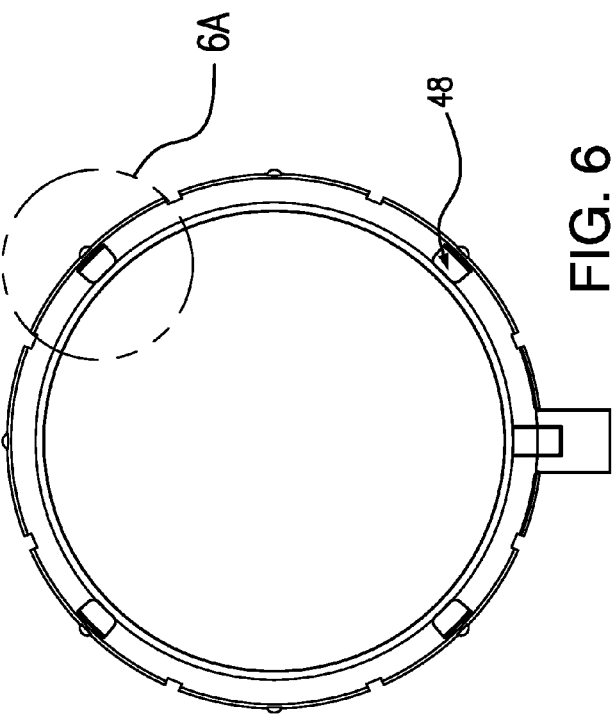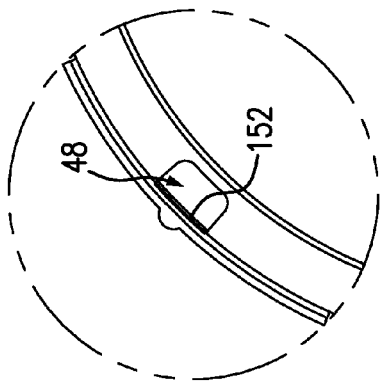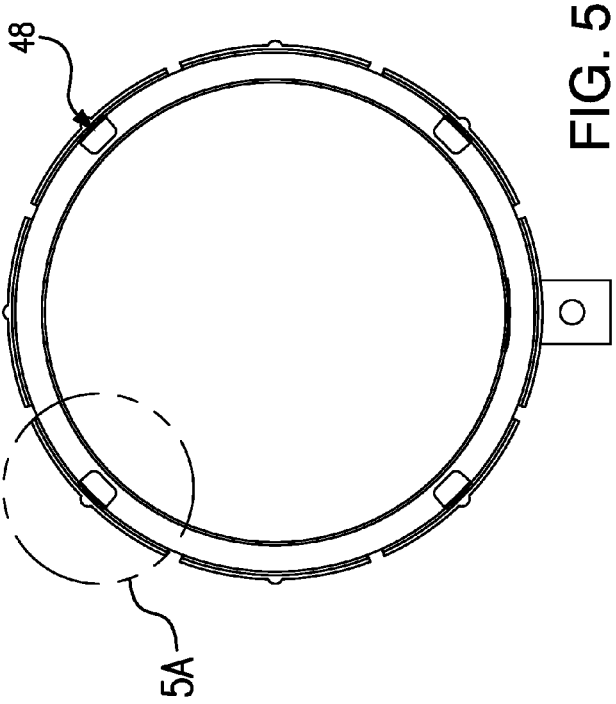

ELECTROFUSION FITTINGS AND METHODS

CROSS-REFERENCE TO RELATED APPLICATION

Benefit is claimed of U.S. patent application Ser. No. 61/843,611, filed Jul. 8, 2013, and entitled "Electrofusion Fittings and Methods", the disclosure of which is incorporated by reference herein in its entirety as if set forth at length.

BACKGROUND

The invention relates to pipe joining More particularly, the invention relates to pipe joining by electrofusion.

A well developed field exists in polymeric piping systems. Perhaps the most well known thermoplastic material for pipes and pipe fittings is polyvinyl chloride (PVC). PVC pipes and fittings are typically joined to each other via the use of a solvent cement to form joints characterized by solvent weld/bonds. Other solvent-weldable materials include chlorinated polyvinyl chloride (CPVC) and acrylonitrile butadiene styrene (ABS).

It may be less practical to solvent weld other thermoplastics such as polyethylene (PE, including high density polyethylene (HDPE) and low density polyethylene (LDPE)), polypropylene (PP), polystyrene (PS), and polybutylene (PB). Thermal welding provided via electrofusion is an alternative to solvent welding. United Kingdom Patent Application GB2260381A and US Patent Application Publication US2006/0016552A1 disclose systems wherein resistive heating elements are at least partially embedded in fittings. A pipe may be inserted into the fitting so as to be encircled by the heating element.

U.S. Pat. No. 3,506,519 discloses a collar/fitting assembly comprising a plastic fitting, an electrofusion collar (i.e., containing the heating element), and a clamp. Additionally, such collars are available from Georg Fischer Harvel LLC, Little Rock, Ark. and Easton, Pa., US (e.g., under the trademark Fuseal II). Several of the Fuseal II collars include an inner wall containing the heating element and a radially spaced-apart segmented outer wall for engaging the clamp. The electrofusion collar is inserted into the fitting socket and, in turn receives the end of a pipe (or a male fitting spigot). The clamp is tightened around the fitting (or collar outer wall) to radially compress the fitting and collar to the pipe to insure no air enters the welding zone.

The heating element may be energized by an electric power source to heat the fitting and the pipe sufficiently to weld the two together. Exemplary power sources are found in U.S. Pat. No. 5,911,895 and are available from Georg Fischer Harvel LLC, Little Rock, Ark. and Easton, Pa., US (e.g., as the MSA family of electrofusion units).

SUMMARY

The prior art clamped electrofusion collar has the tendency to move along the fitting axis during shipping and/or installation, causing partial insertion of the collar into the fitting socket, ultimately resulting in inadequate fusion and subsequent leakage from the joint. There is a need to improve the electrofusion collar assembly to prevent motion along the axis, while retaining the ability for rotational motion around the axis.

One aspect of the disclosure involves an electrofusion collar comprising: an inner wall having a heating element; a segmented outer wall spaced radially apart from the inner wall; and a linking portion linking the outer wall and inner wall. An inner surface of the outer wall bears means for axially registering the collar with a fitting body.

One aspect of the disclosure involves an electrofusion fiting comprising a fitting body and an electrofusion collar. The fitting body has an exterior surface, an interior surface, and a terminal portion extending to a rim. The collar has: an inner wall having a heating element; a segmented outer wall spaced radially apart from the inner wall; and a linking portion linking the outer wall and inner wall. The fitting body terminal portion is between the inner wall and the outer wall. The collar and fitting body have means for axially retaining the collar against extraction from the fitting body while permitting relative rotation of the collar and the fitting body.

In one or more embodiments of any of the foregoing embodiments, the collar may be of molded plastic. The means for axially registering the collar with the fitting body may comprises a plurality of radially inward projections on the inner surface. A band clamp may encircle the outer wall. The outer wall, the linking portion and at least part of the inner wall may be unitarily molded as a single piece.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 3 is a side view of the combination of FIG. 1.

FIG. 4 is a sectional view of the combination of FIG. 3 taken along line 4-4.

FIG. 5 is an underside view of the collar.

FIG. 5A is an enlarged view of a portion of the collar of FIG. 5.

FIG. 6 is a top view of the collar.

FIG. 6A is an enlarged view of a portion of the collar of FIG. 6.

Like reference numbers and designations in the various drawings indicate like elements.

DETAILED DESCRIPTION

Figure 1:
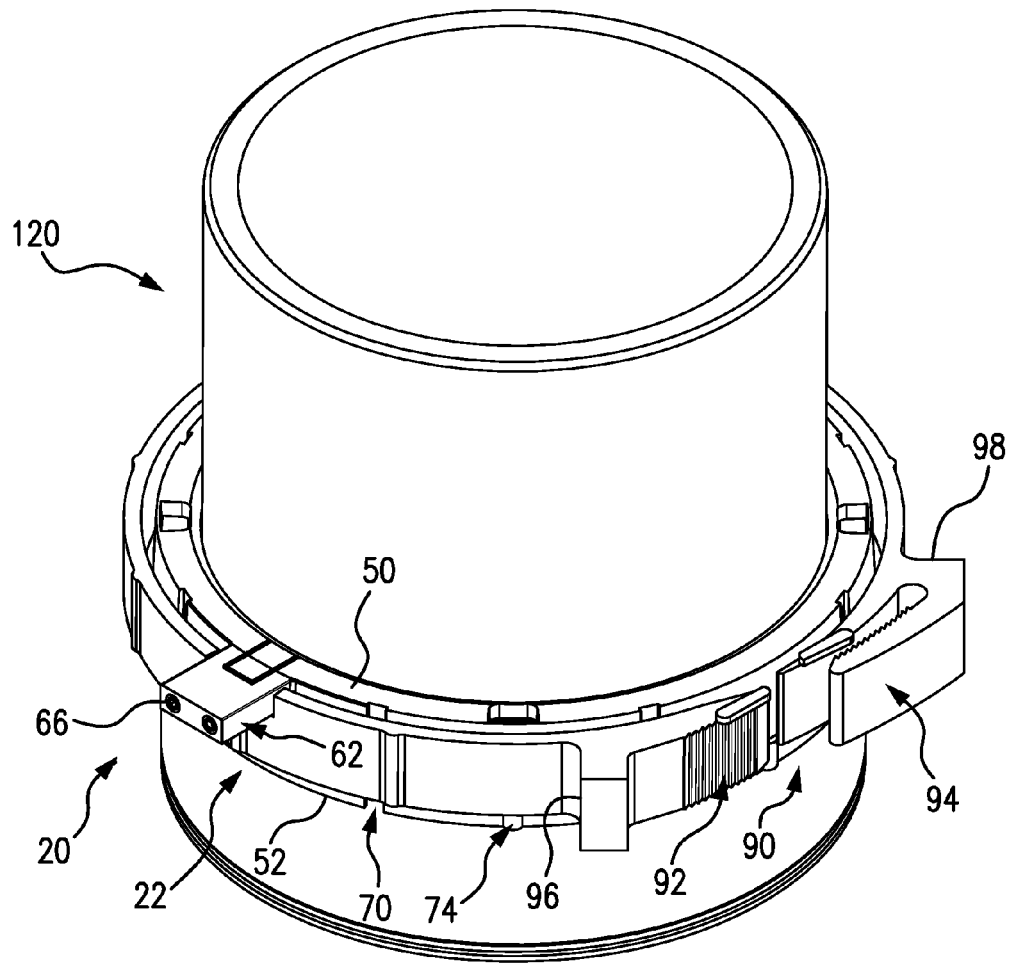
FIG. 1 is a view of the combination of a fitting body and electrofusion collar receiving a pipe in a pre-clamping condition.

FIG. 1 shows a fitting 20 receiving a pipe 120. More particularly, it shows one branch/end 22 of a fitting that may have several ends/branches/ends (e.g., a termination, an elbow, a straight coupler, an adapter, a T-fitting, a Y-fitting, and/or variations on any of these such as a valve body). Exemplary nominal pipe outer diameters are 1 inch to 8 inches (2.5 centimeters to 20 centimeters), more particularly 1½ inches to 6 inches (3.8 centimeters to 15 centimeters).

Exemplary pipe and fitting materials are selected from the group consisting of polyvinylchloride (PVC), chlorinated polyvinylchloride (CPVC), acrylonitrile butadiene styrene (ABS), polyethylene (PE, including high density polyethylene (HDPE), low density polyethylene (LDPE), and linear low density polyethylene (LLDPE)), polypropylene (PP), polystyrene (PS), polybutylene (PB), polyamide (PA), and polyvinyl difluoride (PVDF).

Figure 2:
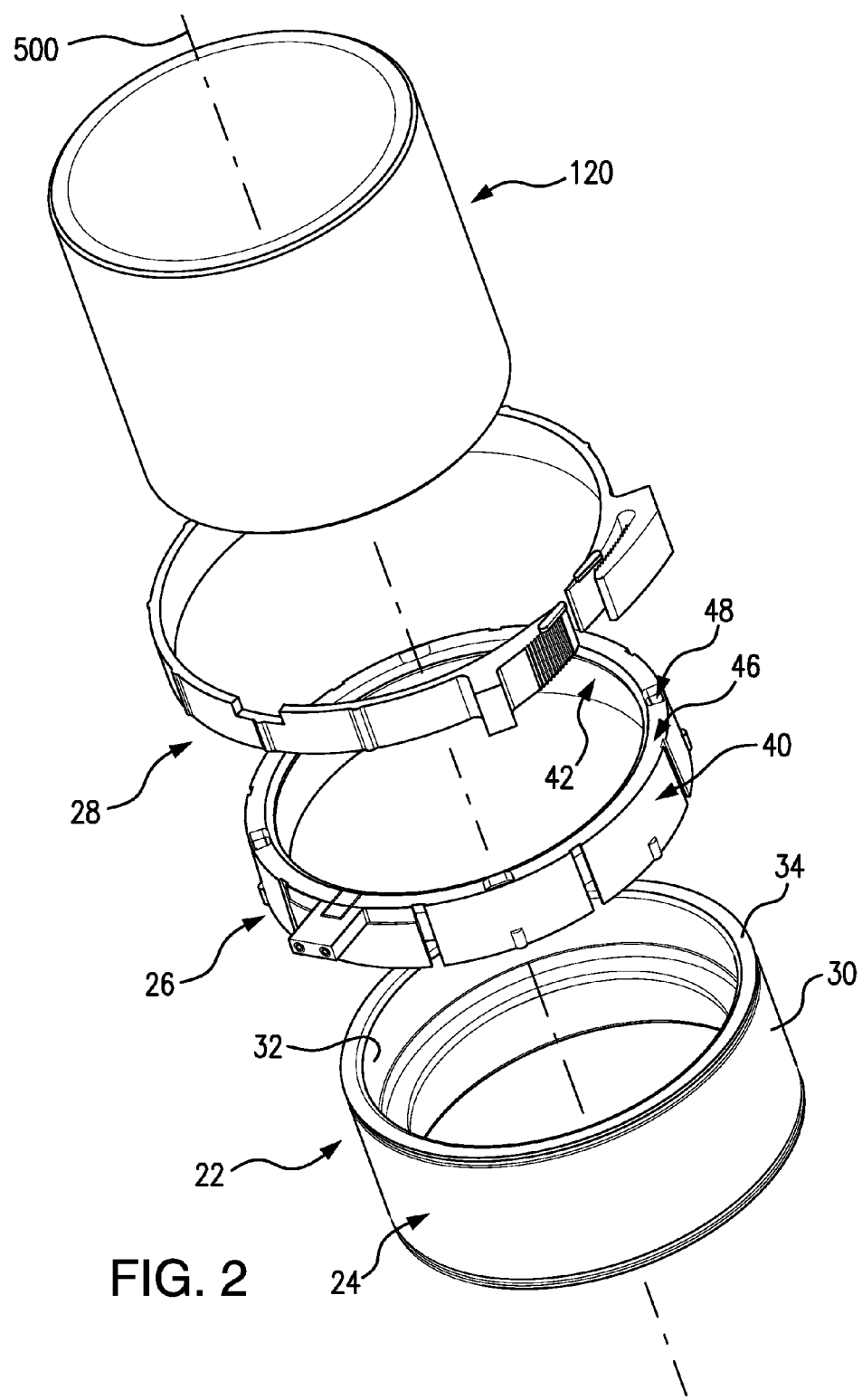
FIG. 2 is an exploded view of the combination of FIG. 1.

FIG. 2 further shows a fitting body 24, an electrofusion collar 26, and a band clamp 28. The branch is shown having a central longitudinal axis 500. Exemplary collar, fitting body, and pipe materials are electrofusion-compatible plastics such as polypropylene.

FIG. 2 shows the body 24 having an exterior/outer surface 30 and an interior/inner surface 32 and extending to a rim 34 which defines an opening.

Figure 4A:
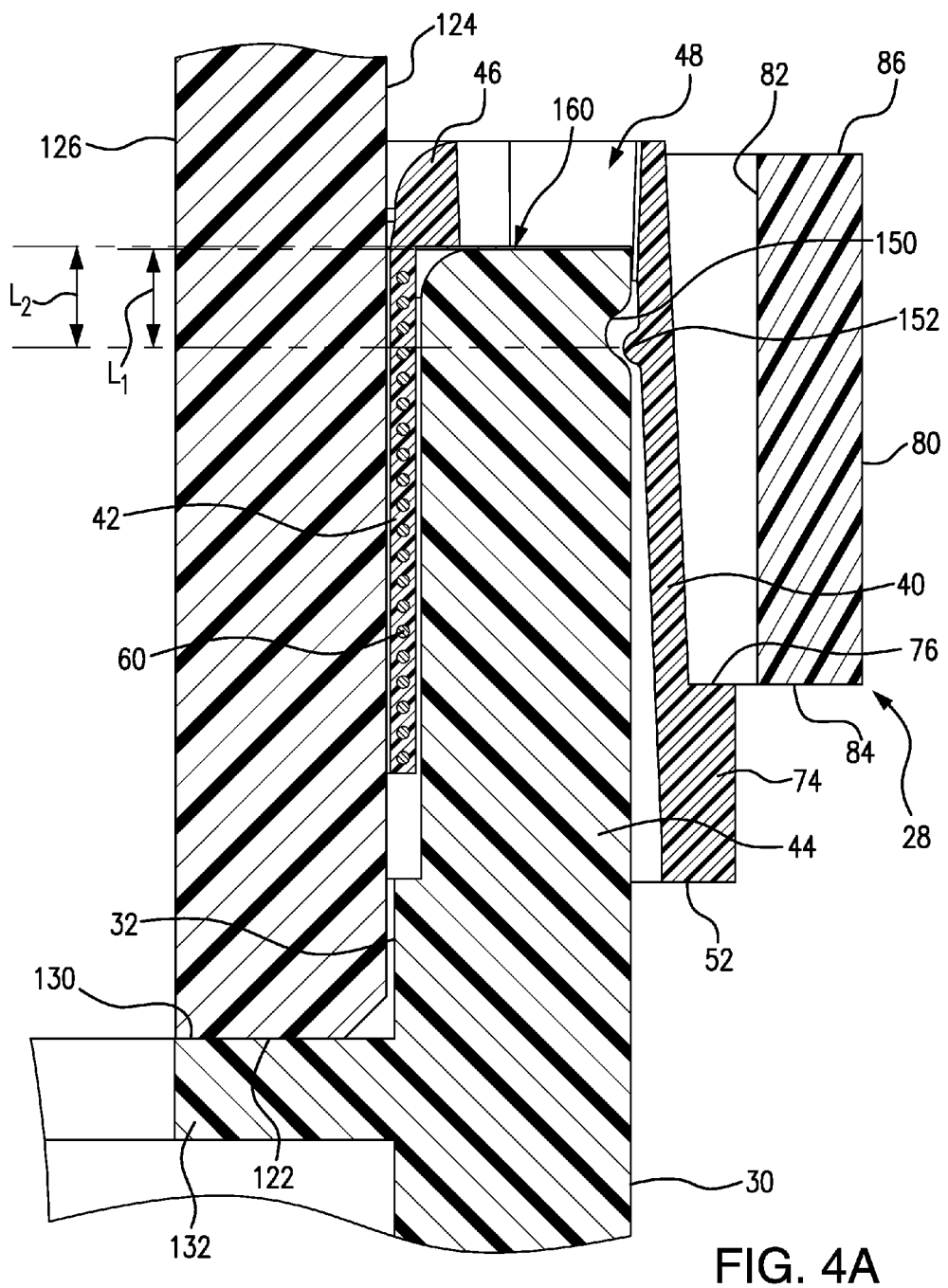
FIG. 4A is an enlarged view of a portion of the combination of FIG. 4.

The collar 26 has an outer/outboard wall 40 and an inner/inboard wall 42 shown in FIG. 4A as respectively outboard of and inboard of a terminal portion 44 of the fitting body which extends to the rim 34. The outboard wall 40 and inboard wall 42 are joined by a web 46. The web has a plurality of apertures 48 which provide visual access to see the position of the fitting body rim 34. The inboard wall 42 contains a heating element 60 (e.g., an electrically conductive coil). In an exemplary manufacturing process, a body portion of the collar may be molded over the coil and its associated leads and contacts (not shown). FIG. 1 shows an electrical connector 62 protruding from the collar outer wall adjacent a rim surface 50 of the web 46. The connector bears contacts 66 coupled to the coil for connection to an electrofusion unit (not shown).

The outboard wall 40 of the collar is segmented by a number of slots 72 to impart radial flexibility to provide compressive engagement from the clamp 28 through to the pipe 120. FIG. 1 also shows a circumferential array of stops 74 along the outboard wall 40 near the axially inboard rim 52 of the outboard wall.

The exemplary clamp has an outer/outboard surface 80 (FIG. 4A) and an inner/inboard surface 82 and has a proximal rim 84 and a distal rim 86. The exemplary plastic clamp has a ratcheting latch 90 (FIG. 1). The exemplary latch comprises a finger 92 insertable into a channel member 94. The finger and channel have complementary barbs to resist extraction of the finger once inserted. The exemplary finger and channel member have outwardly opposite engagement surfaces 96 and 98 for compressive engagement with a pair of pliers to tighten the clamp. Alternative clamps, however, may include conventional metallic band clamps.

To assemble the fitting, the band clamp 28 may be pre-assembled to the collar. Thereafter, the collar 26 may be installed to the fitting body 24 with an outboard surface of the inboard wall 42 closely accommodated within the adjacent portion of the inboard surface 32 of the fitting body. An inboard surface of the outer wall 40 may face the outboard surface 30 of the fitting and be spaced slightly apart when the collar is in a relaxed (unclamped) condition. Similarly, the inboard surface 82 of the band clamp may be adjacent and spaced apart from the outboard surface of the outer wall 40. The band clamp 28 may be axially retained by one or more abutting features axially inboard and outboard. For example, outboard/outward the clamp is retained by being blocked by the connector 62 (e.g., received in a channel in the band of the clamp). Inboard movement may be resisted by the stops 74. At least in some portion of the tightening range of the band clamp, the rim 84 is blocked from axial movement by ends 76 (FIG. 4A) of the stops 74. In alternative implementations, the band clamp may be assembled to the collar after the collar is assembled to the fitting body.

In use, the pipe 120 (FIG. 4A) may then be inserted into the fitting assembly. The pipe 120 has an outboard surface 124, an inboard surface 126, and a rim 122. The rim 122 may abut a surface 130 of a pipe stop 132 of the fitting body (e.g., a radially inwardly projecting flange or shoulder).

The clamp may then be tightened to bring the outer wall 40 into compressive contact with the fitting body. The electrofusion unit may be connected to the connector to energize the heating element to electrofuse the pipe to the fitting body via the collar inboard wall 42. As so far described, the construction is illustrative of the exemplary aforementioned Fuseal II collars.

FIG. 4A, however, shows interfitting features on the fitting body and collar for axially registering the collar 26 with the fitting body 24 while also permitting relative rotation about the axis 500 (at least until a final stage of compressive engagement by the clamp 28). The exemplary features comprise an annular groove or recess 150 along the outboard wall 30 of the fitting body and a complementary projection 152 on the inboard surface of the outboard wall 40 of the collar. As is discussed below, the exemplary projection 152 is a circumferential array of projections. In the exemplary embodiment, each projection 152 is aligned with an aperture 48 and approximately circumferentially coextensive therewith (e.g., an exemplary 8° about the axis 500) the apertures 48 are artifacts of tooling access to mold the upper rim (facing the web 46) of the projection.

When the clamp 28 is tightened, the features 150 and 152 mate (or further mate). At least during some portion of the tightening, the interfitting/cooperation of the features prevents axial movement of the collar relative to the fitting body while permitting rotation. Rotation is desirable to allow the installer to orient the connector 62 in a convenient direction for attaching it to the electrofusion unit.

FIG. 4A further shows the recess 150 centered at a distance $L_1$ from the rim 34 with the projection 152 centered at a distance $L_2$ from an underside of the flange 46. This leaves a gap 160 which may be relatively small and functions merely to reduce friction and ease rotation. An exemplary gap height is 0.020 inch (0.51 mm), more broadly, 0.2-2.0 mm or 0.4-1.0 mm. In one embodiment, exemplary, $L_1$ is 0.100 inch (2.54 mm) and exemplary $L_2$ is 0.120 inch (3.05 mm). Exemplary manufacturing tolerance on $L_1$ and $L_2$ is ±0.005 inch (0.127 mm).

The exemplary recess 150 and projection 152 in longitudinal section are of approximately semicircular form with rounded transitions. Exemplary radii of such semicircles are 0.030 inch (0.762 mm) for the recess 150 and 0.020 inch (0.508 mm) for the projection 152. Exemplary manufacturing tolerance is ±0.005 inch (0.127 mm). These radii define respective recess depth and protrusion height. More broadly, exemplary recess depth may be 0.3 mm to 5 mm or 0.3 mm to 2 mm.

With the exemplary segmentation of the collar outer wall 40, the projections 152 are centrally along associated segments. In the exemplary embodiment, only half the segments have projections 152.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic electrofusion fitting system, details of such configuration or its associated use may influence details of particular implementations. Accordingly, other embodiments are within the scope of the following claims.

What is claimed is:

1. An electrofusion collar (26) comprising:
an inner wall (42) having a heating element (60);
a segmented outer wall (40) spaced radially apart from the inner wall; and
a linking portion (46) linking the outer wall and inner wall,
wherein:
an inner surface of the outer wall bears means (152) for axially registering the collar with a fitting body (24).

2. The collar of claim 1 being of molded plastic.

3. The collar of claim 1 wherein:
the means for axially registering the collar with the fitting body comprises a plurality of radially inward projections (152) on the inner surface.

4. The collar of claim 1 further comprising:
a band clamp (28) encircling the outer wall.

5. The collar of claim 1 wherein:
the outer wall, the linking portion and at least part of the inner wall are unitarily molded as a single piece.

6. The collar of claim 1 in combination with a fitting body wherein:
the means for axially registering the collar with the fitting body axially registers the collar with the fitting body.

7. The combination of claim 6 wherein:
the means for axially registering the collar with the fitting body engages an annular groove (150) of the fitting body.

8. The combination of claim 6 wherein:
the means for axially registering the collar with the fitting permits relative rotation of the collar and fitting.

9. The combination of claim 6 wherein:
the means for axially registering the collar with the fitting registers the collar and fitting with an axial separation of a rim (34) of the fitting from the linking portion.

10. A method for using the combination of claim 6, the method comprising:
inserting a member into the collar; and
tightening a band clamp (28) around the outer wall.

11. A method for using the collar of claim 1, the method comprising:
installing the collar to a fitting body with a rim portion of the fitting body being received between the inner wall and outer wall; and
tightening a band clamp around the outer wall.

12. The method of claim 11 further comprising:
installing a member into the collar.

13. The method of claim 12 wherein:
the member is a pipe.

14. The method of claim 12 further comprising:
energizing the heating element to electrofuse the member to the fitting via the collar.

15. An electrofusion fitting (20) comprising:
a fitting body (24) having an exterior surface (30), an interior surface (32), and a terminal portion (44) extending to a rim (34);
an electrofusion collar (26) comprising:
an inner wall (42) having a heating element (60);
a segmented outer wall (40) spaced radially apart from the inner wall; and
a linking portion (46) linking the outer wall and inner wall, the fitting body terminal portion being between the inner wall and the outer wall
wherein:
the collar and fitting body have interfitting features (152, 150) axially retaining the collar against extraction from the fitting body while permitting relative rotation of the collar and the fitting body, the interfitting features of the collar being along an inboard surface of the outer wall.

16. The fitting of claim 15 further comprising:
a band clamp (28) encircling the collar outer wall.

17. The fitting of claim 15 wherein:
the linking portion has a plurality of apertures (48).

18. The collar of claim 17 wherein:
the interfitting features of the collar comprise a plurality of radially inward projections (152); and
each of the plurality of radially inward projections (152) is aligned with a respective associated one of the apertures.

19. The collar of claim 3 wherein:
the linking portion has a plurality of apertures (48); and
each of the plurality of radially inward projections (152) is aligned with a respective associated one of the apertures.

20. The collar of claim 1 wherein:
the linking portion has a plurality of apertures (48).

* * * * *